US008824808B2

(12) United States Patent
Brandt et al.

(10) Patent No.: US 8,824,808 B2
(45) Date of Patent: Sep. 2, 2014

(54) METHODS AND APPARATUS FOR AUTOMATED FACIAL FEATURE LOCALIZATION

(75) Inventors: Jonathan W. Brandt, Santa Cruz, CA (US); Zhe Lin, Fremont, CA (US); Vuong Le, Urbana, IL (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/563,556

(22) Filed: Jul. 31, 2012

(65) Prior Publication Data

US 2013/0044958 A1      Feb. 21, 2013

Related U.S. Application Data

(60) Provisional application No. 61/525,630, filed on Aug. 19, 2011.

(51) Int. Cl.
*G06K 9/46* (2006.01)
*G06K 9/50* (2006.01)

(52) U.S. Cl.
USPC ............ 382/201; 345/420; 382/118; 382/159

(58) Field of Classification Search
USPC ................... 345/420; 382/118, 159, 201, 203
See application file for complete search history.

(56) References Cited

U.S. PATENT DOCUMENTS

| | | | |
|---|---|---|---|
| 7,333,648 B2 * | 2/2008 | Edic et al. ..................... 382/131 | |
| 7,720,281 B2 | 5/2010 | Lu et al. | |
| 7,787,664 B2 | 8/2010 | Luo et al. | |
| 8,165,354 B1 * | 4/2012 | Zhao ............................. 382/118 | |
| 2003/0053685 A1 | 3/2003 | Lestideau | |
| 2003/0223622 A1 | 12/2003 | Simon et al. | |
| 2006/0008145 A1 | 1/2006 | Kaku | |
| 2006/0018522 A1 * | 1/2006 | Sunzeri et al. ................ 382/118 | |
| 2008/0050015 A1 | 2/2008 | Lu et al. | |
| 2008/0063263 A1 * | 3/2008 | Zhang et al. .................. 382/159 | |
| 2008/0238942 A1 | 10/2008 | Sun et al. | |
| 2011/0182517 A1 | 7/2011 | Farsiu et al. | |
| 2012/0014610 A1 * | 1/2012 | Nakashi et al. ............... 382/195 | |
| 2012/0306874 A1 * | 12/2012 | Nguyen et al. ................ 345/420 | |
| 2012/0308124 A1 * | 12/2012 | Belhumeur et al. .......... 382/159 | |
| 2012/0311031 A1 * | 12/2012 | Latta et al. .................... 709/204 | |
| 2013/0044947 A1 | 2/2013 | Brandt et al. | |
| 2013/0044958 A1 * | 2/2013 | Brandt et al. ................. 382/201 | |

OTHER PUBLICATIONS

Banham, Mark R., et al., "Digital Image Restoration", *IEEE Signal Proc.*, (Mar. 1997), pp. 24-41.

Cho, et al., "Fast Motion Deblurring", *Proceedings of ACM Transactions on Graphics*, vol. 28, Issue 5, (Dec. 2009), 8 pages.

(Continued)

*Primary Examiner* — Gregory M Desire
(74) *Attorney, Agent, or Firm* — Wolfe-SBMC

(57) ABSTRACT

Various embodiments of methods and apparatus for facial retouching are disclosed. In one embodiment, a face in an input image is detected. One or more transformation parameters for the detected face are estimated based on a profile model. The profile model is applied to obtain a set of feature points for each facial component of the detected face. Global and component-based shape models are applied to generate feature point locations of each facial component of the detected face.

18 Claims, 13 Drawing Sheets

(56) References Cited

OTHER PUBLICATIONS

Fergus, et al., "Removing Camera Shake from a Single Photophraph", Retrieved from <http://people.csail.mit.edu/fergus/paper/deblur_fergus.pdf> Nov. 28, 2012, (2006), 8 pages.

Freedman, et al., "Image and Video Upscaling from Local Self-Examples", *ACM Transactions on Graphics*, vol. 30 Issue 2, (Apr. 2011), 11 pages.

Glasner, et al., "Super-Resolution from a Single Image", *Super-Resolution form a Single Image*, (Oct. 20, 2009), 8 pages.

Levin, et al., "Image and Depth from a Conventional Camera with a Coded Aperture", ACM Transactions on Graphics, *SIGGRAPH 2007 Conference Proceedings*, San Diego, CA, Retrieved from <http://groups.csail.mit.edu/graphics/CodedAperture/CodedAperture-LevineEtAl-SIGGRAPH07.pdf> on Dec. 21, 2012,(2007), 9 pages.

Lucy, L.B. "An iterative technique for the rectification of observed distributions", *The Astronomical Journal*, vol. 79, No. 6, (Jun. 1974), pp. 745-754.

Richardson, Willaim H., "Bayesian-Based Iterative Method of Image Restoration", *Journal of the Optical Society of America*, vol. 62, No. 1, (Jan. 1972), pp. 55-59.

Shan, et al., "High-quality Motion Deblurring from a Single Image", Retrieved from <http://www.google.com/url?sa=t&rct=j&q=&esrc=s&source=web&cd=2&ved=0CEMQFjAB&url=http%3A%2F%2Fciteseerx.ist.psu.edu%2Fviewdoc%2Fdownload%3Fdoi%3D10.1.1.218.6835%26rep%Drep1%26type%3Dpdf&ei=yjm1UIT6O4iLiAKTooCoAQ&usg=AFQjCNGjzsbOGrl-6NYIkUK, ACM Trans. Graphics, 27(3):73:1-73:10,(Aug. 2008), 10 pages.

Rebecca Morelle "From Mortal to Model" BBC News, http://news.bbc.co.uk/2/hi/technology/4795343.stm, downloadedDec. 14, 2012, last updated Aug. 16, 2006, pp. 1-3.

"Non-Final Office Action", U.S. Appl. No. 13/563,606, Dec. 23, 2013, 7 pages.

Rother, et al., ""GrabCut"—Interactive Foreground Extraction using Iterated Graph Cuts", ACM SIGGRAPH 2004, Aug. 2004, 6 pages.

Shih, et al., "Adaptive mathematical morphology for edge linking", Information Sciences—Informatics and Computer Science: An International Journal, vol. 167, Issue 1-4, Dec. 2, 2004, pp. 09-21.

"Notice of Allowance", U.S. Appl. No. 13/563,606, May 9, 2014, 6 pages.

"Final Office Action", U.S. Appl. No. 13/563,606, Apr. 24, 2014, 9 pages.

Ioannou, et al.,' "Robust Feature Detection for Facial Expression Recognition", EURASIP Journal on Image and Video Processing, Aug. 2007, pp. 1-22.

\* cited by examiner

METHODS AND APPARATUS FOR AUTOMATED FACIAL FEATURE LOCALIZATION

This application claims benefit of priority to U.S. Provisional Application Ser. No. 61/525,630, which was filed on Aug. 19, 2011, the content of which is incorporated herein by reference in its entirety.

BACKGROUND

Description of the Related Art

The recent profusion of inexpensive digital cameras has enabled the creation of a much broader universe of digital image content. New market entrants are now able to bring image capture to environments and events for which such image capture was previously considered cost prohibitive or technically unfeasible. In the past few decades, cameras have become smaller and more robust, and therefore portable to environments where photography was previously considered to be extremely difficult due to either the harshness of the environment or the inconvenience of introducing the camera equipment form factor into the space where the camera was desired.

Modern digital cameras are also able to capture more images to smaller media and remain in service for a greater number of exposures, thereby increasing the desirability of a camera in situations where cameras were previously not worth the inconvenience. Further, advances in the material design of camera cases have created a generation of cameras that may be used in harsh environments, such as extreme temperature or exposure to moisture.

As a result of more common opportunities to require portraits of persons, portrait photo editing is a common task for both professional and amateur photographers. In conventional systems, generation of a well edited portrait may require hours of interaction with an editing system to retouch the photo.

SUMMARY

Various embodiments of methods and apparatus for facial retouching are disclosed. In one embodiment, a face in an input image is detected. One or more transformation parameters for the detected face are estimated based on a profile model. The profile model is applied to obtain a set of feature points for each facial component of the detected face. Global and component-based shape models are applied to generate feature point locations of each facial component of the detected face.

Figure 1:
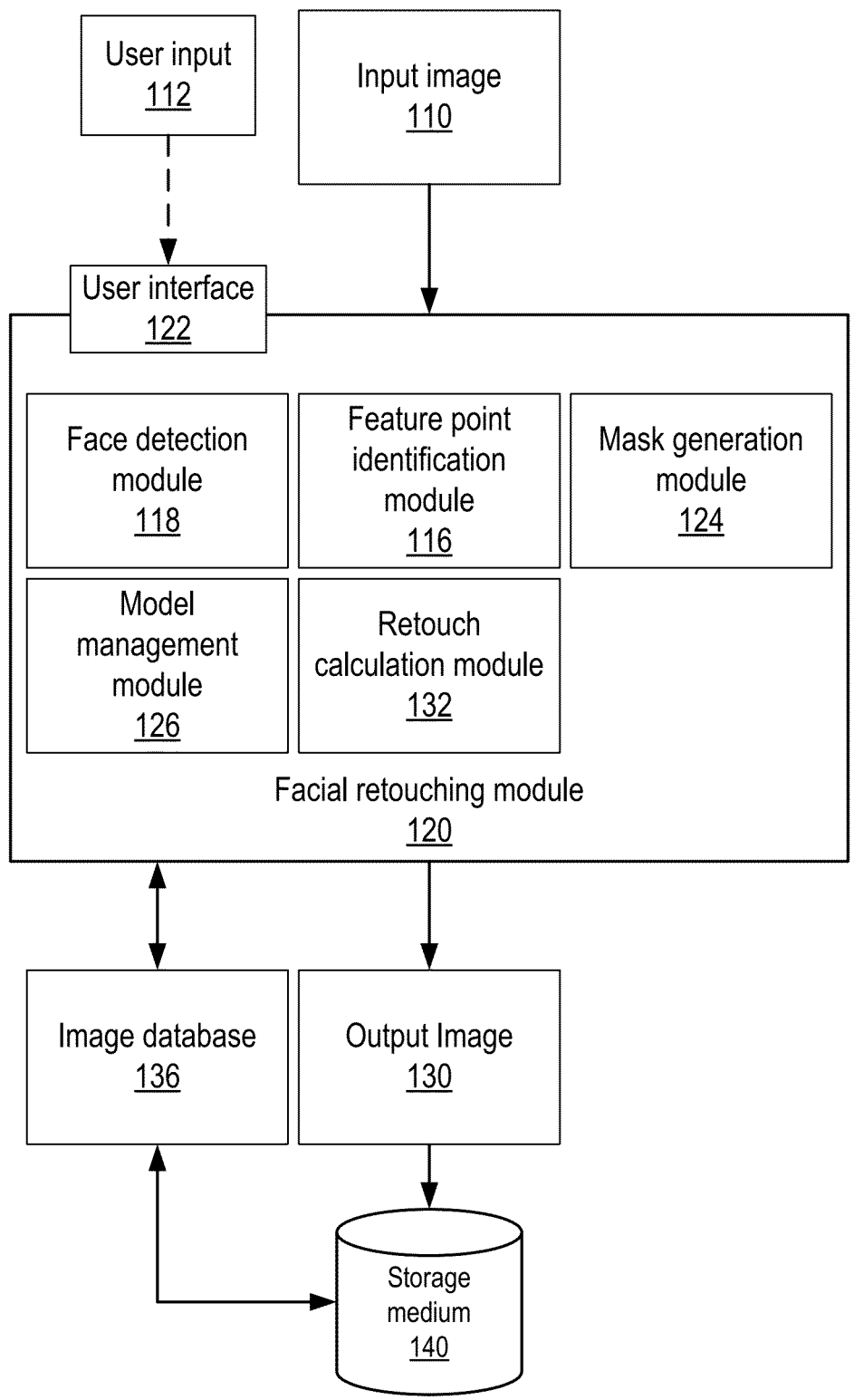
FIG. 1 illustrates a facial retouching module that may implement automated portrait retouching using facial feature localization, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Introduction to Automated Portrait Retouching Using Facial Feature Localization

Some embodiments employ an algorithm for locating facial features in high resolution portrait photos to automate the workflow of single-image portrait retouching, allowing some non-expert users to achieve editing effects with minimal effort and expertise. Some embodiments employ a component-based Active Shape Model algorithm in a coarse-to-fine manner.

In conjunction with the component-based Active Shape Model algorithm, some embodiments also employ a face database with natural portrait photos taken under diverse conditions. In some embodiments, the database consists of a set of photos, together with a set of annotations for each photo. The annotations consist of a set of indexed landmark feature points at prescribed facial positions, as described below with respect to FIG. 4. In some embodiments, localization results are then used for generating precise masks of different features of the face. Embodiments employing such an automatic workflow allow users to apply desired retouching effects on specific facial regions in a manner that reduces the level of user interaction needed to generate facial feature masks for retouching tasks.

Some embodiments use an algorithm, described below, for automatic facial feature localization and automated portrait editing. For facial feature localization, some embodiments employ coarse-to-fine, global-to-local strategies referred to herein as a component-based active shape model (ASM). Some embodiments apply a non-linear model for modeling the global shape (a configuration of component models) to adapt better to the irregular statistics of realistic data.

For automatic feature mask generation, embodiments combine feature locations from component-based ASM with a Gaussian mixture model (GMM)-based skin tone selection and a "Quick Select" tool to achieve segmentation of complicated facial feature areas, and apply editing effects accordingly.

Some embodiments also support user interactivity for correcting errors in feature localization and segmentation. Some embodiments support collection and integration of interactivity information for improving the model in an active learning framework. In some embodiments detecting independent sets of feature points for respective facial feature components includes detecting the independent sets of feature points for the respective facial feature components using interactivity information or other user input as a constraint. In some embodiments detecting the independent sets of feature points for the respective facial feature components further includes detecting the independent sets of feature points for the respective facial feature components using a component-based approach.

A database of portraits with annotations (each individually a $p_{ij}$) is used by some embodiments to generate a generally applicable model representing a wide variety of facial photos, with respect to which photos are collected and users are, in some embodiments, asked to provide detail localization of facial contours through a crowdsource application.

Figure 4:
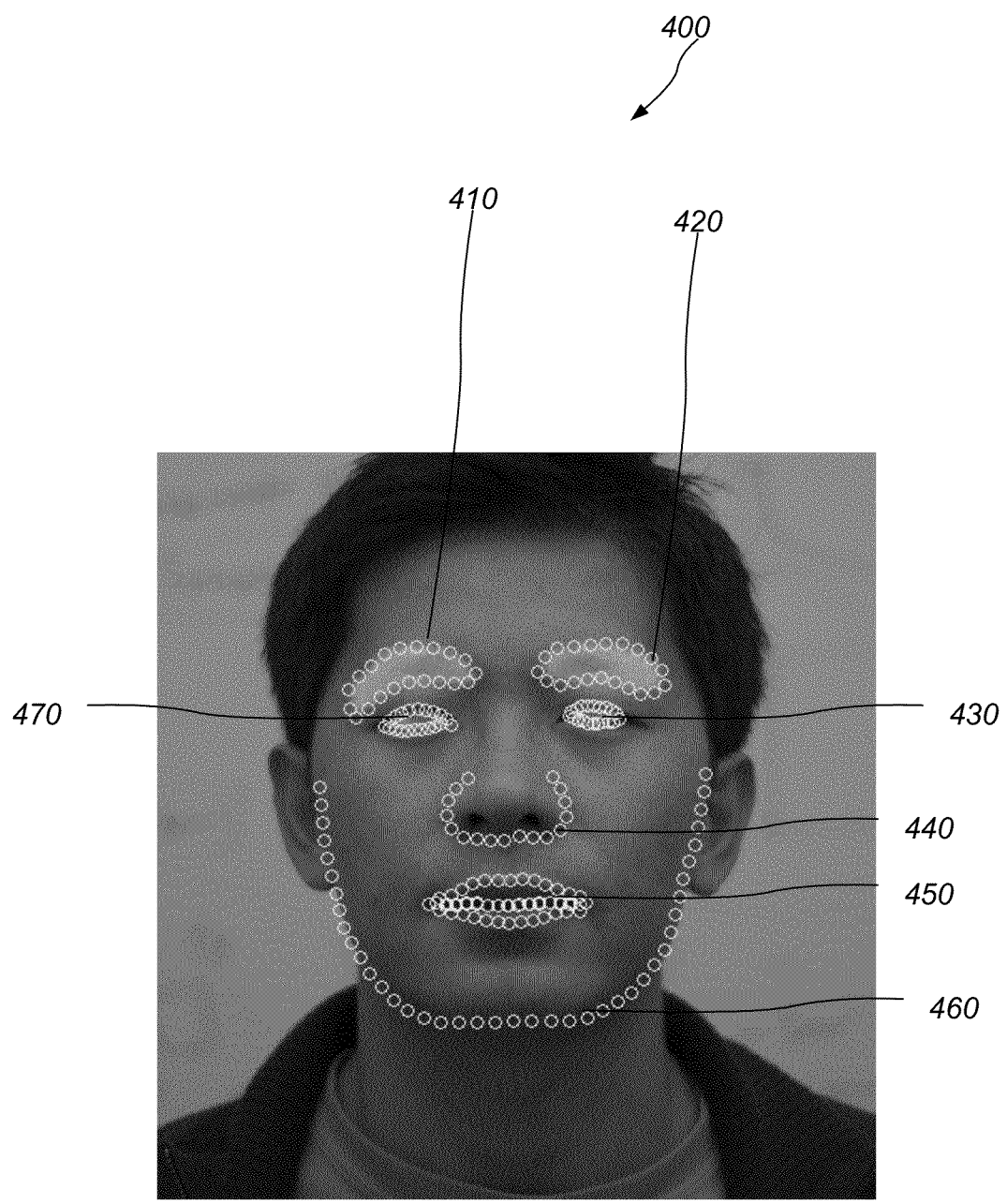
FIG. 4 depicts a set of feature points resulting from automated facial feature localization, according to some embodiments.

In some embodiments, a set of two-dimensional feature point of the face in image coordinate system is modeled as $$F=\{p_{ij}\}(i=1\ldots c, j=1\ldots m_i) \quad (1),$$

where $p_{ij}$ is the $j^{th}$ point of component i, c is the number of components, and $m_i$ is the number of points in component i. Some embodiments employ a face model consisting of seven 7 components: jawline, nose, lips, left eye, right eye, left brow, eye brow. An example of such a model on a face-fitting result of one embodiment is shown in FIG. 4, discussed below. In such a component-based model, feature points are obtained by transformation from local coordinates of each component by:

$$p_{ij}=sR(q_{ij}+t_i)+t_0. \quad (2)$$

where
$t_i$ represents the coordinate of centroid of component i in face coordinate system and s, R, and $t_0$ represent scale, rotation and translation of the face to the global coordinate system, respectively. In each component, its points are represented in that component's principle component analysis (PCA) subspace $$q_i=\bar{q}_i+\Phi_i b_i \quad (3),$$

where
$q_i$: stacked up vector of $q_{ij}$
$\bar{q}_i$: mean vector of $q_i$s
$\Phi_i$: shape basis of component i
$b_i$: shape parameters of component i The $\bar{q}_i$ and $\Phi_i$ are determined using PCA analysis on the training set. These parameters comprise the component shape model for component i. In such a face coordinate system, the location of each component i is specified by $t_i$, a coordinate of a center of mass. When stacked up, they form a vector $t=[t_i]$ for a face. Embodiments implement a PCA on this vector space to generate the susbspace representation $$t=\bar{t}+\Psi r \quad (4),$$

where $\Psi$ represents a global shape basis and r represents a global shape parameter. $\bar{t}$ and $\Psi$ are determined from PCA analysis on the training data. These parameters comprise the global shape model. The relationship between equations 2 and 4 is illustrated by calculating the mean of 2 over each component:

$$\bar{p}_i=sR(\bar{q}_i+t_i)+t_0. \quad (5)$$

where
$\bar{p}_i$: coordinate of centroid of component i in global coordinate system and
$\bar{q}_i$: coordinate of centroid of component i in its own coordinate system.

Embodiments employ a local coordinate system with a root at center of mass then, such that $\bar{q}_i$ is zero, and $$\bar{p}_i = sR(t_i) + t_0. \quad (6)$$

Stacking results and combination with equation four result in $$\bar{p} = sR(\bar{t} + \psi r) + t_0 \quad (7),$$

where $\bar{p}$ is the stacked up $\bar{p}_i$ values from equation (5) and $\bar{t}$ is the mean of locations of component centroids in face coordinate system. Some embodiments use Eq. 7 in a global fitting step in the shape search algorithm presented below.

In some embodiments, given a photo of human face, the embodiment first detects the face area, such as by using a conventional face detector. The feature point locations are initialized with the mean locations relative to the face detection window determined from the training set.

In some embodiments, the off-line training process is as follows. For each training set image, the face detector is applied, which returns a detection window around the face. The positions of the feature point locations relative to the detection window for that training instance are recorded. These locations are averaged over all training instances to determine the mean locations of the feature points relative to the face detection window. For a new image (not in the training set), the face detection window is used to predict the initial locations of the feature points. Referring briefly to FIG. 2B, which is described below, the search then proceeds iteratively (e.g., through blocks 250, 245, 250, 255, 260).

With a bounding rectangle obtained from the face detector, embodiments initialize global and local shape models of the components. Embodiments then iteratively perform a component-based ASM (Active Shape Model)-style fitting procedure. Examples of Active Shape Model operations are discussed at in work by T. F. Cootes, C. J. Taylor, D. H. Cooper, J. Graham, titled "Active shape models—their training and application", which is available at *Computer Vision and Image Understanding* 61 (1) (1995) 38-59. Another example of a component-based ASM (Active Shape Model)-style fitting procedure is found at Milborrow, S., Nicolls, F.: Locating facial features with an extended active shape model. In: ECCV. (2008). With suggested locations found by matching appearance of surrounding locations of the current point to a template profile, embodiments fit the global and then the local model, and then the profile models, iteratively. In some embodiments, the process typically converges in a few iterations.

Specifically, in some embodiments a template profile is determined for each feature point from the training data. The template profile for a particular feature point consists of a set of samples of the grayscale gradient of the image extending perpendicularly to the contour to which the feature point belongs. Typically, embodiments sample 10 gradient values in each direction, forming a vector of 20 components to represent the grayscale appearance changes at that feature point. These vectors are normalized to unit magnitude to compensate for variations in illumination. The relative fit of a particular location is quantified as the Mahalanobis distance of the corresponding profile template to the mean profile template for that feature point. During the iterative search process, the appearance search (referring briefly again to FIG. 2B, described below, block 245) consists of sampling a range of offsets perpendicularly from the current location and identifying the offset position that minimizes the Mahalanobis distance. This search is done independently for each feature point. The new location for each feature point is the location that minimizes this distance among the set of possible locations tested. During the subsequent shape fitting steps (referring briefly again to FIG. 2B, described below, blocks 250 and 255), the feature points are further moved to be consistent with the face shape. The parameters for the Mahalanobis distance computation include the mean profile value and the covariance matrix for the profile values for each feature point. These parameters are determined during an off-line training process.

Figure 8:
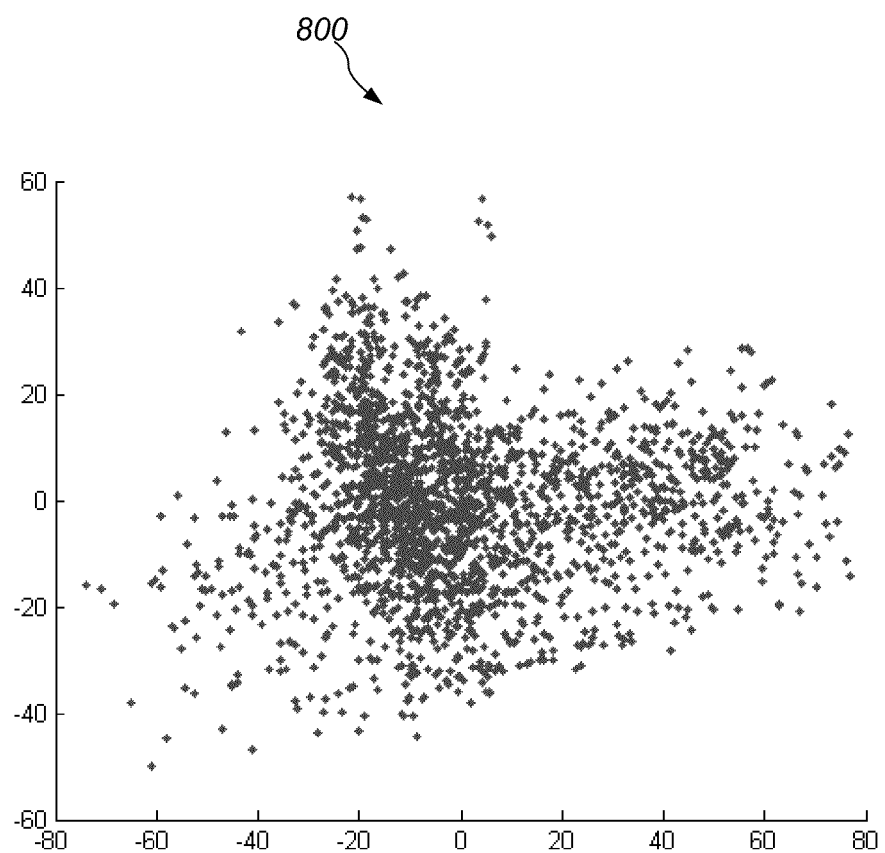
FIG. 8 illustrates a global shape space for a face shape database, according to some embodiments.

Example Methods for Automated Portrait Retouching Using Facial Feature Localization In the global fitting step, it is known from empirical evidence that some embodiments demonstrate that the global parameter space is highly non-Gaussian, as depicted in FIG. 8, where the first two PCA modes of the training data of an embodiment of the database are plotted. In order to overcome the irregular shape of the data, some embodiments use a soft nearest neighbor search to regularize the global shape to be close to one of the training exemplar, which in some embodiments is done in a low (around 10) dimensional space to provide robustness to the non Gaussian distribution of global shape configuration.

Some embodiments use an algorithm of the form:
(A) Initialization
  (1) Estimate s, R, $t_0$ from face detection
  (2) Initialize r=0, $b_i$=0, $t_i = \bar{t}_i$
(B) Iteration
  (1) Do appearance search for all points using profile model to obtain $p_{ij}$
  (2) Estimate model parameters by iterating these steps:
    align current appearance with the mean shape fit by finding similarity transform parameters s, R and $t_0$ that make the best fit using equation 7
    fix the similarity transform parameters, fit appearance centroids $p_i$ to the global shape model to obtain r using equation 7 and soft nearest neighbor regularization strategy.
    derive $q_i$ from global model parameters, solve $b_i$, $q_i$ from 3
  (2) Check conversion, if not, iterate up to (B1)

Embodiments using component-based ASM may be understood in terms of classic ASM by noting that, in classic ASM, the location of a facial point is represented by $$p_{ij} = sR(\bar{p} + \Gamma c) + t \quad (8),$$

as compared to embodiments, in which the location is represented by $$p_{ij} = sR(q_{ij} + t_i) + t_0 \quad (9)$$

or $$p_{ij} = sR(\bar{q}_i + \Phi_{ij} b_i + \bar{t}_i + \psi_i t_i) + t_0 \quad (10).$$

From these formulas, it is demonstrated that some embodiments employing component-based ASM present a sparser shape basis where inter-component shape correlation is ignored. Also, the relative locations of components are explicitly modeled in global model in some embodiments. Thanks to these characteristics, some embodiments give enhanced freedom to component shape and therefore operate on more possible shapes. Further, some embodiments are able to employ a nonlinear global shape model by using a low dimension space of $t_i$. Some embodiments exhibit enhanced robustness to occlusion, because an occluded component can be dropped from the global shape model and consequently decoupled from the other components. Some embodiments further allow more convenient integration of user interaction. In some embodiments, user interactivity is provided as an interface allowing user to move fitted points to a desired place. Previously-user-moved points are considered to be trusted and are not moved in the next round of iteration. Some embodiments utilize constrained linear least squares in each shape fitting step to find the best location of other points following the constraints in real-time.

Looking at component PCA in eq. 3. given, q, $\bar{q}$ and $\phi$ while omitting the index i (for the sake of simplicity without losing generality), the unconstrained least square solution of b is $$b = (\phi^T \phi)^{-1} \phi^T (q - \bar{q}) \qquad (11).$$

After i interactivity, embodiments may have received a set of points $q_j$ fixed by a user to location $q^*_j$. Some embodiments add a constraint $\phi_j b_j = q^*_j$ to the solution. Forming the lagrangian and solving the lagrangian, some embodiments implement a constrained optimal solution as the solution of the system:

$$\begin{cases} \bar{q}_3 + \phi_q b - q_3 = 0 \\ 2\phi^T \phi b - 2(q - \bar{q})^T \phi + \lambda \phi_j = 0 \end{cases} \qquad (12)$$

where $\lambda$ is the LaGrange multiplier.

In some embodiments, a database described above is built by selecting and downloading a large pool of high-resolution images. A face detector is applied to find bounding boxes of the faces, then standard ASM is applied to generate a rough estimation of facial feature points. Using face detection and shape fitting scores, the best appropriate subset of images are chosen to be database members. Using initial contours found by ASM, the images are submitted to a crowdsourcing system to have the accurate and detail location of points marked by people in the crowdsource community. An interface for receiving the feature points from crowdsource workers is captured as FIG. 9, which is discussed below. The labeling results are then reviewed and approved by reviewers. Some embodiments learn improved models over time by adding the examples that have been hand corrected by the user to the training set and then retraining Some embodiments locate facial features in high resolution portrait photos and automate the work flow of portrait retouching to improve results achievable by non-experts with minimal effort. Given a portrait image, some embodiments locate the major landmarks on a face, including the eyes, nose, mouth, and face boundaries. Once the landmarks have been located, masks are constructed for the relevant face regions (eyes, lips, skin, teeth, and brows) to enable the editing step. Embodiments then present an interactive interface for the user to do common portrait corrections such as skin softening, eye contrast and sharpening, and lip and teeth enhancement.

Some embodiments provide a semi-automatic workflow based on computer vision techniques to automatically detect the face, localize the relevant facial features (eyes, brows, nose, lips, jaw), break the portrait image into layers using accurate soft masks generated from the facial feature coordinates for each of the areas of the face to be modified, and provide simple, intuitive, controls to apply the adjustments. Examples of the controls include, skin smoothness, eye sharpness and contrast, whitening of sclera and teeth, lip color and contrast adjustment, skin tone adjustment, and control of lighting on the eye area.

In addition to control over the adjustments to the facial appearance, some embodiments allow the user to also adjust the automatically determined feature locations, so that, for instance, if the eye corner is located incorrectly by the embodiment, the user can pull the eye corner to the correct location, and the other point locations are moved according to this user-provided constraint, with consequent effect on the location of the respective layer masks.

Additionally, some embodiments learn a particular user's style preferences by saving the adjustment settings made by a user over a period of time, and choosing default settings based on these preferences. Learning users' preferences in terms of semantic adjustments (e.g. eye sharpness or skin smoothness) enables embodiments to obtain results different from those based on preferences based on low-level numerical settings (such as blur radius) that a user might choose if directly retouching the face, because the low-level settings have dependencies on the underlying image characteristics (such as resolution) rather than on the task characteristics.

Some embodiments employ a component-based active shape model approach to accommodate variation in appearance, pose, and expression. Some embodiments support the capability to receive simple user-guided corrections through constrained optimization, and some embodiments use a large training data set of high resolution, high quality portraits that have been marked with their facial feature locations.

Once facial features have been located, some embodiments construct the following masks from the facial feature points:
Eyes: all of the eyes, but no skin of the eyelids
Brows
Inner mouth: visible part of interior of the mouth
Lips
Skin: exposed skin on the face discounting the above regions In some embodiments, many regions are defined using a common procedure to select a closed region given the contour points. Some embodiments do not use the contour points directly in order to improve the likelihood of placing the contour along an image edge so that the transition area is not very perceptible. A procedure for such an operation as used in some embodiments may be described as follows:
Procedure: SelectClosedRegion
1. Render the closed region into the mask as all ones (the exterior is zeros). In some embodiments, the "closed region" is the polygon defined by the contour points.
2. Erode the closed region by an amount proportional to the size of the region (The size is determined by distance transform) (this is the foreground mask).
3. Dilate the region determined in step 1. By the same amount as in 2 into a separate buffer (the background mask)
4. Run a graph cut operation (such as Photoshop Quick Select) to find the optimal image boundary between the foreground and background regions. This results in a buffer where the selected region is all ones, and the exterior is all zeros.
5. Blur the resulting buffer using Gaussian blur with sigma proportional to the region size. This creates a gradual transition between the foreground and background.

Figure 5:
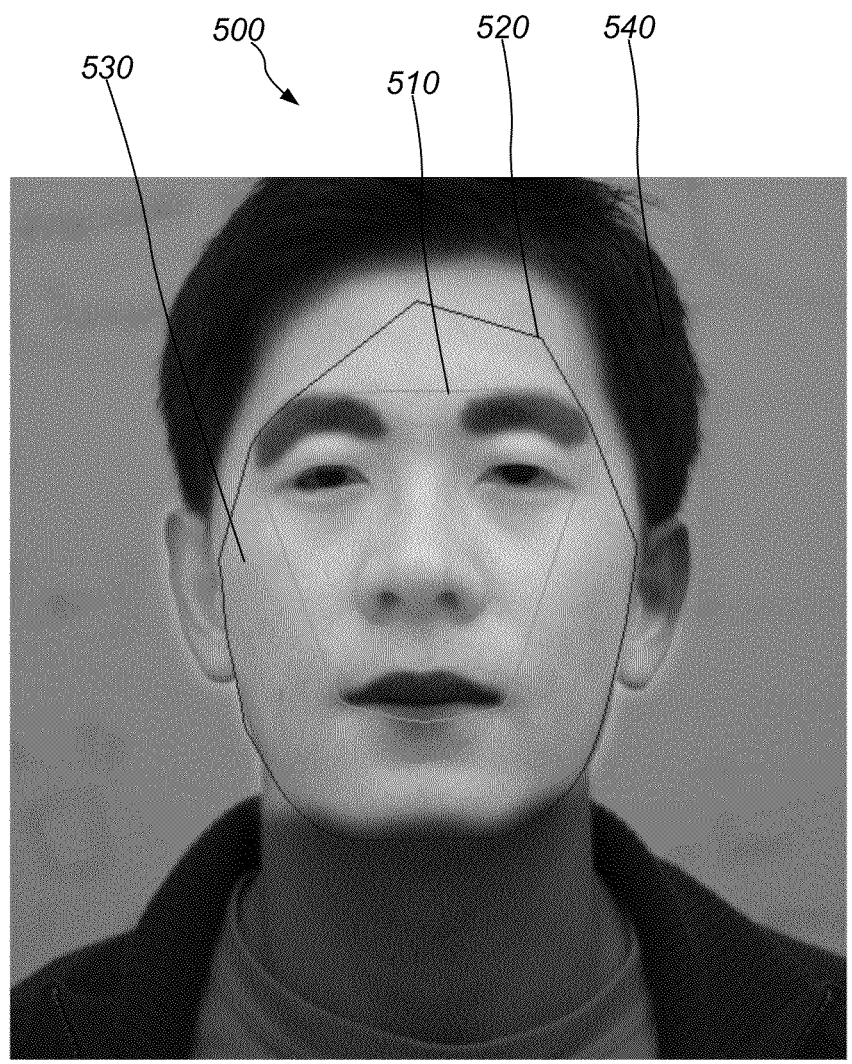
FIG. 5 illustrates a facial mask resulting from automated facial feature localization, according to some embodiments.

An example of a face mask is shown in FIG. 5. Once the mask regions are determined, some embodiments are ready for retouching. Some embodiments precompute a set of layers that can be composited together based on user interactions. Some embodiments support a broad range of possible corrections through a retouch calculation module, as is described below.

Figure 3A:
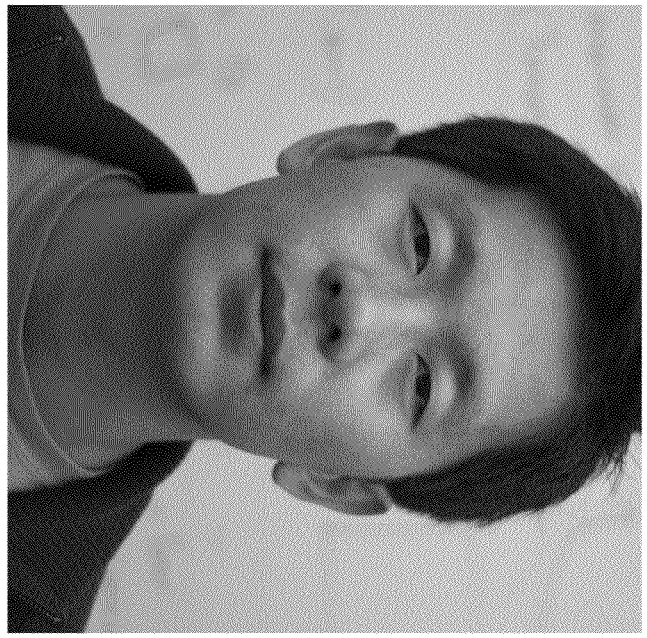
FIG. 3A depicts an input image for use with automated portrait retouching using facial feature localization, according to one embodiment.
Figure 3B:
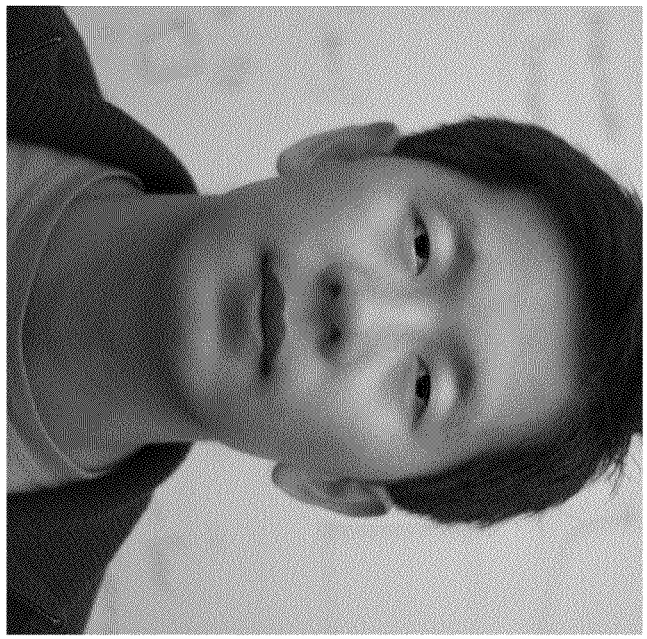
FIG. 3B illustrates an output image resulting from automated portrait retouching using facial feature localization, according to one embodiment.

An example of the result of applying these operations is shown in FIG. 3B using one embodiment with default settings for compositing. In some embodiments, the user controls each of the effects independently through a GUI such as a set of sliders.

Example Embodiments

Various embodiments of methods and apparatus for automated portrait retouching using facial feature localization are presented. Some embodiments include a means for retouching a facial portrait using automated facial feature localization in an input image. For example, a facial retouching module may receive input identifying a digital image, and may identify feature points with iterative user correction, as described herein. The facial retouching module may then construct masks and allow the user to retouch the face using automated controls. The facial retouching module may in some embodiments be implemented by a non-transitory, computer-readable storage medium and one or more processors (e.g., CPUs and/or GPUs) of a computing apparatus, including a handheld computing device. The computer-readable storage medium may store program instructions executable by the one or more processors to cause the computing apparatus to perform receiving input identifying an image for retouching, performing feature point identification with iterative user correction, mask construction and allowing the user to retouch the face using automated controls, as described herein. Other embodiments of a facial retouching module may be at least partially implemented by hardware circuitry and/or firmware stored, for example, in a non-volatile memory.

FIG. 1 illustrates a facial retouching module that may implement automated portrait retouching using facial feature localization, according to some embodiments. FIG. 1 depicts a facial retouching module that may implement one or more of the for automated portrait retouching using facial feature localization editing techniques and tools illustrated in FIGS. 1-9. Facial retouching module 120 may, for example, implement one or more of facial detection, feature detection, mask generation and retouching as described herein. FIG. 10 illustrates an example computer system on which embodiments of facial retouching module 120 may be implemented. Facial retouching module 120 receives as input one or more input images 110. An example image is shown in FIG. 3A. Facial retouching module 120 may receive user input 112 activating a facial feature retouching editing tool. Facial retouching module 120 then edits the input image(s) 110, according to user input 112 received via user interface 122, using the facial retouching editing tool. The user may activate a may activate other tools and further edit the image. Facial retouching module 120 generates as output one or more output images 130. Output image(s) 130 may, for example, be stored to a storage medium 140, such as system memory, a disk drive, DVD, CD, etc.

In some embodiments, facial retouching module 120 may provide a user interface 122 via which a user may interact with the facial retouching module 120, for example to activate facial retouching module 120, to select an input image, and to indicate feature point corrections, and to indicate desired retouch settings as described herein. In some embodiments, the user interface may provide user interface elements whereby the user may select options including, but not limited to settings for retouching.

Embodiments of facial retouching module 120 may include a face detection module 118 for detecting a face in input image 110. Embodiments of facial retouching module 120 may include a feature point identification module 116 for identifying feature points of a face in input image 110. Embodiments of facial retouching module 120 may include a mask generation module 124 for generating masks from feature points derived from face in input image 110.

In some embodiments, computation of masks is performed by mask generation module 124 as follows:
1. Eyes: Run SelectClosedRegion for each eye and combine them using the Max operation.
2. Brows: Run SelectClosedRegion for each brow and combine them using the Max operation.
3. Inner mouth: Run SelectClosedRegion for the inner lips contour.
4. Lips: Run SelectClosedRegion for the outer lips contour, then combine with the inner mouth region using Max (outer_lips, 1−inner_mouth)
5. Skin: Once the other masks are determined, the determination of the skin mask proceeds as follows:
    A. Forehead points are constructed by projecting from each eye center of mass through the respective brow center of mass a distance 1.5 times the distance between the points, and a similar projection from the nose center of mass through the mid point between the eyes.
    B. The convex hull of the forehead points, combined with all the other feature points forms a new contour, called the outer face.
    C. SelectClosedRegion is run on the outer face.
    D. The eyes, brows, and mouth are removed from the resulting region using max(outer_face, 1−max (brows, eyes, lips, inner_mouth)).
    E. Pixels from the resulting selected region are sampled and transformed into the "Lab" color space. Then a Gaussian Mixture Model is learned to estimate the probability that a given pixel is skin given its Lab color. Some embodiments demonstrate that the GMM is effective with 6 mixture components.
    F. Once a skin probability estimate for all pixels exists, some embodiments determine the skin mask through the following steps:
        a. Form a foreground selection by shrinking the outer face region by 10%.
        b. Form a background selection by growing the outer face by 50%.
        c. From the foreground region, remove all pixels whose skin probability is less than a threshold.
        d. To the background region, add all pixels whose probability is less than a threshold.
        e. Run graph cut to find a boundary between foreground and background.
        f. Blur the selected region as before to form a gradual transition region. In this case the sigma is much larger than in the case of the facial feature masks.
        g. Finally, the previously determined masks for the eyes, brows, and mouth are removed from the selected skin area.

Embodiments of facial retouching module 120 may include a retouch calculation module 132 for performing retouching operations on input image 110. Embodiments of facial retouching module 120 may include a model management module 126 for interacting with an image database 136 in order to refine models used for feature point identification and mask generation with respect to input image 110. Image database 136 includes images together with the annotated feature point locations, which enable the training process.

In some embodiments, face detection module 118 performs detecting a face in an input image 110. A feature point identification module 116 performs detecting independent sets of feature points for respective facial feature components. A mask generation module 124 performs generating a plurality of masks for each of the facial feature components, and a retouch calculation module 132, using the plurality of masks, performs retouch effects to the facial feature components. In some embodiments, the detecting the independent sets of feature points for the respective facial feature components by feature point identification module 116 includes detecting the independent sets of feature points for the respective facial feature components using a component-based active shape model for facial feature localization.

In some embodiments, mask generation module 124 performs presenting the feature point locations through user interface 122, receiving user modifications of the feature point locations, and modifying ones of the plurality of masks based on the user modifications as parts of the generating the plurality of masks for each of the facial feature components. In some embodiments, mask generation module 124 performs rendering a closed region into a selected mask as a set of ones, eroding the closed region by an amount proportional to a size of the closed region, dilating the closed region, executing a graph cut operation to generate a buffer for the closed region, and blurring the buffer. In some embodiments, the generating the plurality of masks further comprises generating a skin mask with a skin probability for each of a set of pixels.

In some embodiments, the retouch calculation module 132 performs adjusting one or more facial component shapes based on the plurality of masks. In some embodiments, the retouch calculation module 132 performs adjusting one or more facial component colors based on the plurality of masks. Examples of operations performed by retouch calculation module 132 include:
1. Skin smoothing: The image is blurred using Gaussian blur with sigma proportional to the face size (parameterized by the inter-eye distance). The blurred version is composited with the original in the skin mask area according to a constant blend factor determined by the user. If the factor is zero, then no smoothing is done. If it is one, then the skin is very smooth.
2. Eye and lip sharpening: A sharpened version of the image is composited with the result of 1 in the eye and lip mask areas according to a blend constant determined by the user.
3. Lip color enhancement: A more saturated version of the image is composited with the result of 2 in the lip area according to a blend constant determined by the user.
4. Teeth whitening: A whitened version of the teeth is precomputed by first determining the brightness statistics of the inner mouth and then desaturating the bright parts of the inner mouth. This whitened teeth image is then composited with the result of 3 according to a user controlled blend constant.
5. Eye whitening: A whitened version of the eyes is precomputed in a manner analogous to 4 but using the brightness statistics in the eyes. This whitened eye image is composited with the result of 4 according to a blend constant determined by the user.
6. Spot lighting: Soft mask in the eye region is precomputed by blurring the eye mask with Gaussian blur with sigma equal to ¼ the inter-eye span and scaled so that its maximum value is one. This is called the "spotlight mask" A copy is made of the result of 5, and then adjusted for brightness and contrast according to user-determined brightness/contrast parameters. This adjusted version of 5 is composited with the result of 5 in the spotlight mask region.

In some embodiments, face detection module 118 performs detecting a face in an input image 110. A feature point identification module 116 performs estimating one or more transformation parameters for the detected face based on a profile model, applying the profile model to obtain a set of feature points for each facial component of the detected face, and applying global and component-based shape models to generate feature point locations of the each facial component of the detected face. Some embodiments iterate the applying the profile model and the applying the global and component-based shape models until a change in the feature point locations is less than a threshold and present the feature point locations to a user.

In some embodiments, model management module 126 performs generating the profile model from a training image data set. In some embodiments, the estimating the transformation parameters performed by feature point identification module 116 includes calculating a translation parameter, a scale parameter and a rotation parameter of the detected face relative to the profile model. In some embodiments, feature point identification module 116 performs presenting the feature point locations, receiving user input representing corrections to selected ones of the feature point locations, and iterating the applying the profile model and the applying the global and component-based shape models until a change in the feature point locations is less than a threshold, with respect to which the iterating the applying the profile model and the applying the global and component-based shape models further includes treating the corrections to the selected ones of the feature point locations as fixed locations for the selected ones of the feature point locations.

In some embodiments, the applying the component-based shape model includes determining local shape parameters for each of a set of components. In some embodiments, the applying the component-based shape model includes obtaining a set of global shape parameters.

Figure 2A:
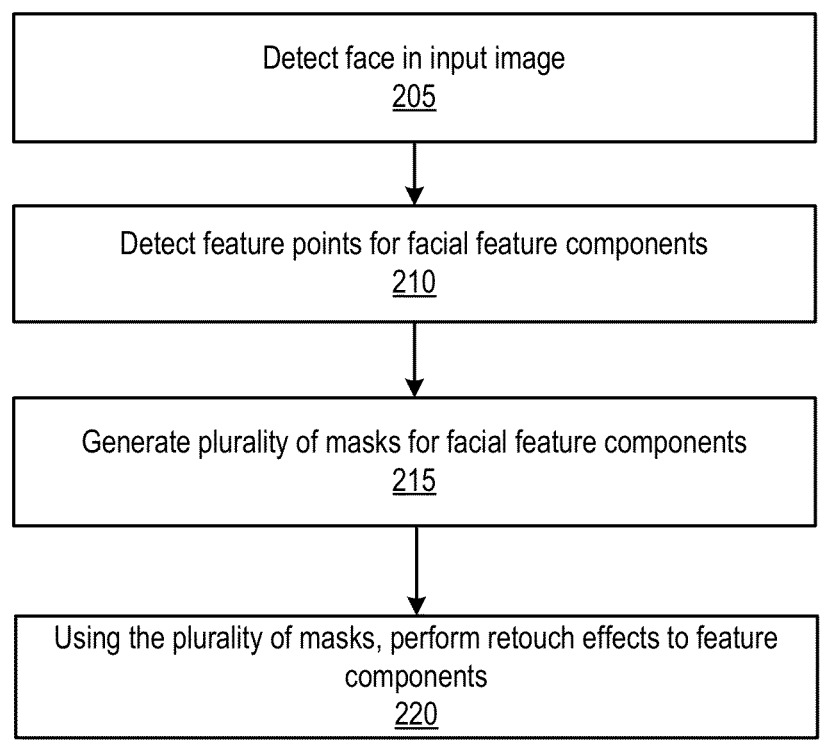
FIG. 2A is a high-level logical flowchart of a method for automated portrait retouching using facial feature localization, according to some embodiments.
Figure 2B:
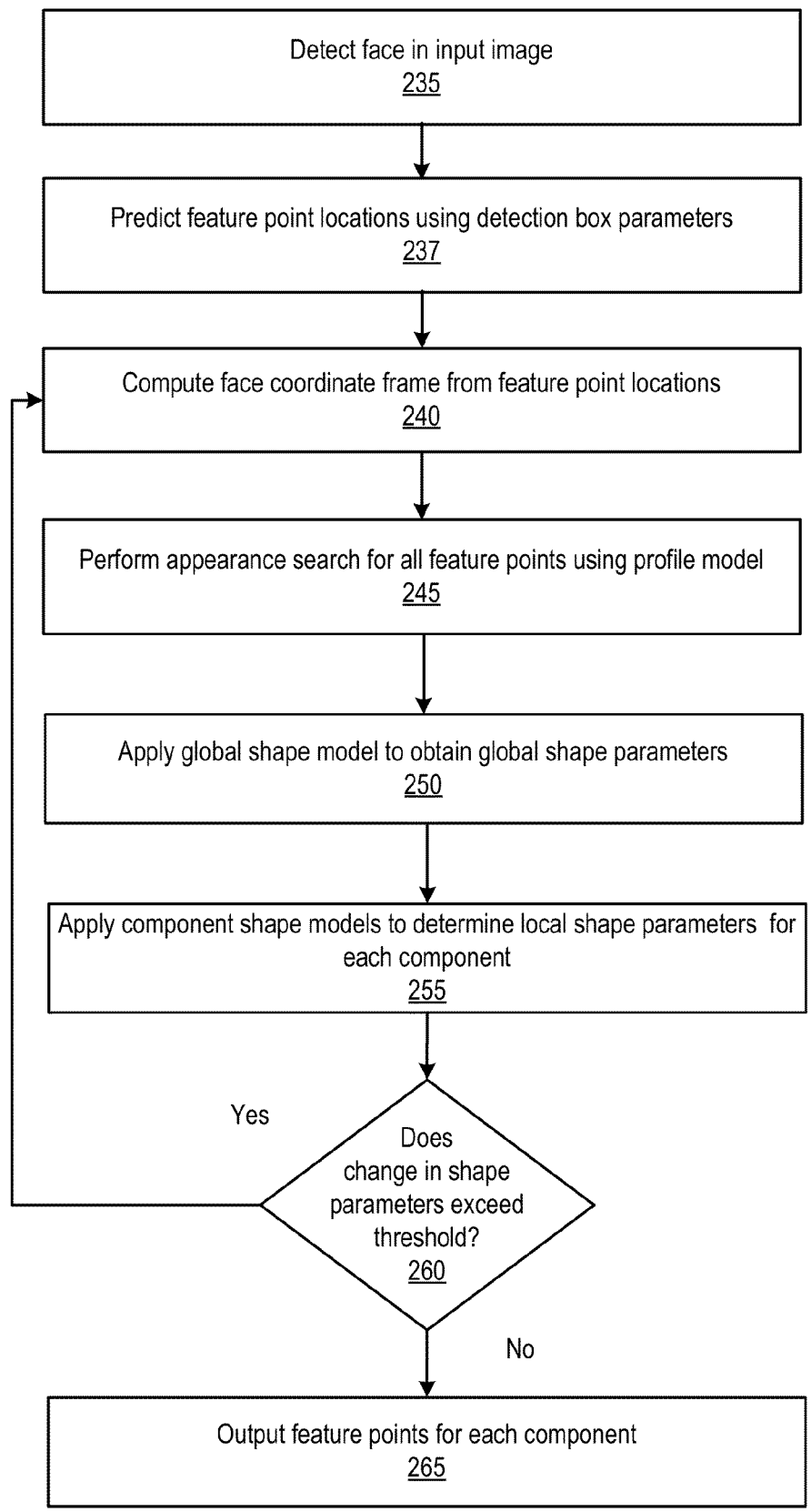
FIG. 2B is a high-level logical flowchart of a method for automated facial feature localization, according to some embodiments.

FIG. 2A is a high-level logical flowchart of a method for automated portrait retouching using facial feature localization, according to some embodiments. A face is detected in an input image (block 205). Feature points for facial feature components are detected (block 210). A plurality of masks for facial feature components are generated (block 215). Using the plurality of masks, retouch effects are performed on the feature components (block 220).

FIG. 2B is a high-level logical flowchart of a method for automated facial feature localization, according to some embodiments. A face is detected in an input image (block 235). Feature point locations are predicted using detection box parameters (block 237). A face coordinate frame is predicted from feature point locations (block 240). An appearance search for all feature points using a profile model from training data is performed (block 245).

A global shape model is applied to obtain global shape parameters (block 250). Component shape models are applied to determine local shape parameters and local feature point coordinates for each component (block 255). A determination is made as to whether a change in the shape resulting from block 255 has exceeded a threshold (block 260). If the threshold is exceeded, the process returns to block 240, which is described above. If the threshold is not exceeded, feature points for each component are provided as output (block 265). As one of skill in the art will readily realize in view of having read the present disclosure, the loop from block 240 to block 260 will, in some embodiments, be iterated multiple times in a surrounding control structure that runs from coarse to fine resolution. Such embodiments start at a coarse resolution, and when it converges, move to the next higher resolution step using the converged point locations as initialization for the next round.

Figure 2C:
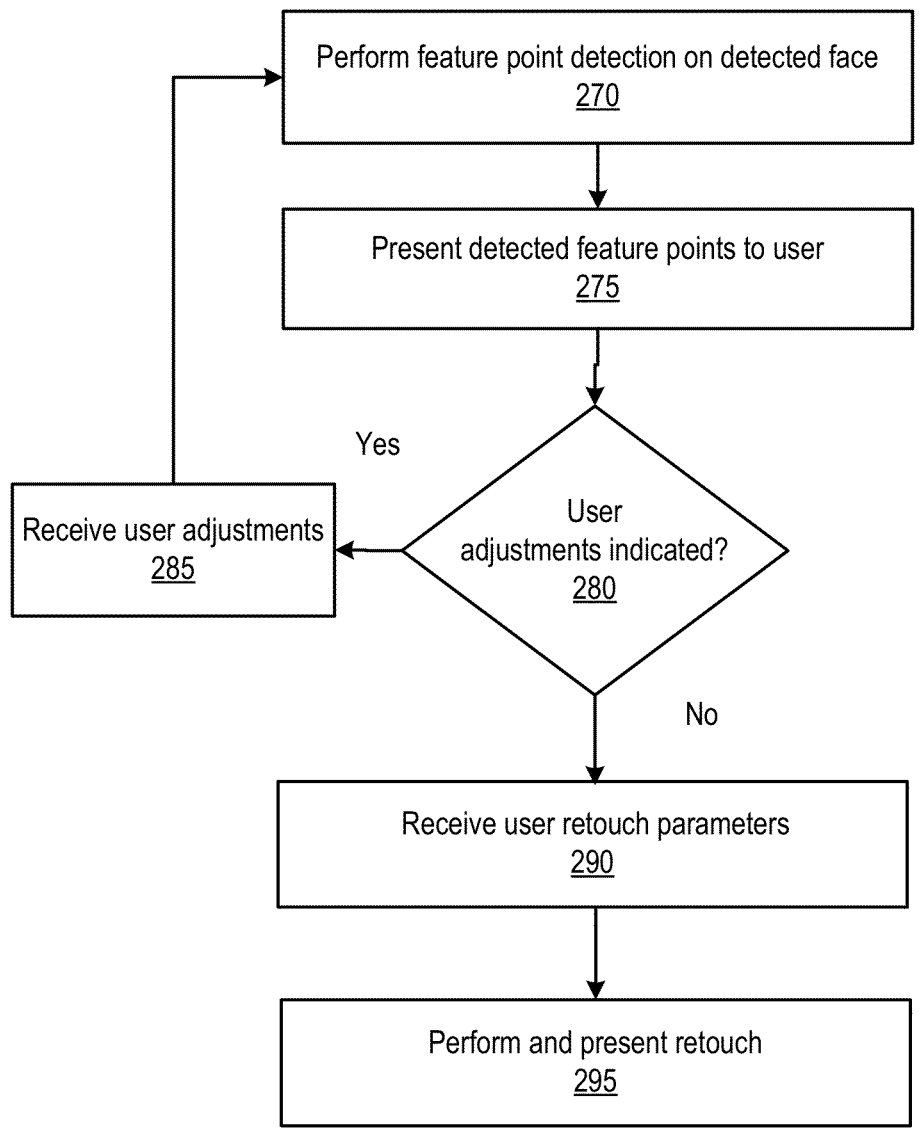
FIG. 2C is a high-level logical flowchart of a method for automated portrait retouching using facial feature localization, according to some embodiments.

FIG. 2C is a high-level logical flowchart of a method for automated portrait retouching using facial feature localization, according to some embodiments. Feature point detection is performed with respect to a detected face (block 270). Detected feature points are presented to a user (block 275). A determination is made as to whether the user has indicated adjustments to the feature points (block 280). If the user has indicated adjustments to the feature points, the adjustments are received (block 285). The process then returns to block 270, which is described above. Returning to block 280, if no user adjustments are indicated, retouch parameters are received from the user (block 290). Retouch operations are performed and results are presented (block 295).

FIG. 3A depicts an input image for use with automated portrait retouching using facial feature localization, according to one embodiment. Input image 300 is used for a retouch operation.

FIG. 3B illustrates an output image resulting from automated portrait retouching using facial feature localization, according to one embodiment. Output image 320 results from the retouch operations using embodiments as described herein.

FIG. 4 depicts a set of feature points resulting from automated facial feature localization, according to some embodiments. In input image 400, feature points (circles) are provided for left brow 410, right brow 420, right eye 430, nose 440, lips 450, jawline 460, and right eye 470.

FIG. 5 illustrates a facial mask resulting from automated facial feature localization, according to some embodiments. In input image 500, an inner mask contour represented by light contour 510 is constructed to exclude eyes, eyebrows, nose and mouth, while an outer mask contour represented by dark contour 520 takes in the forehead, cheeks and chin. The dark contour 520 shows the outer face convex hull. The light contour 510 is the inner face. The pale area 530 is the skin mask determined after forming the GMM model and running graph cut. Note that regions outside the outer face are included but the hair 540 is excluded.

Figure 6A:
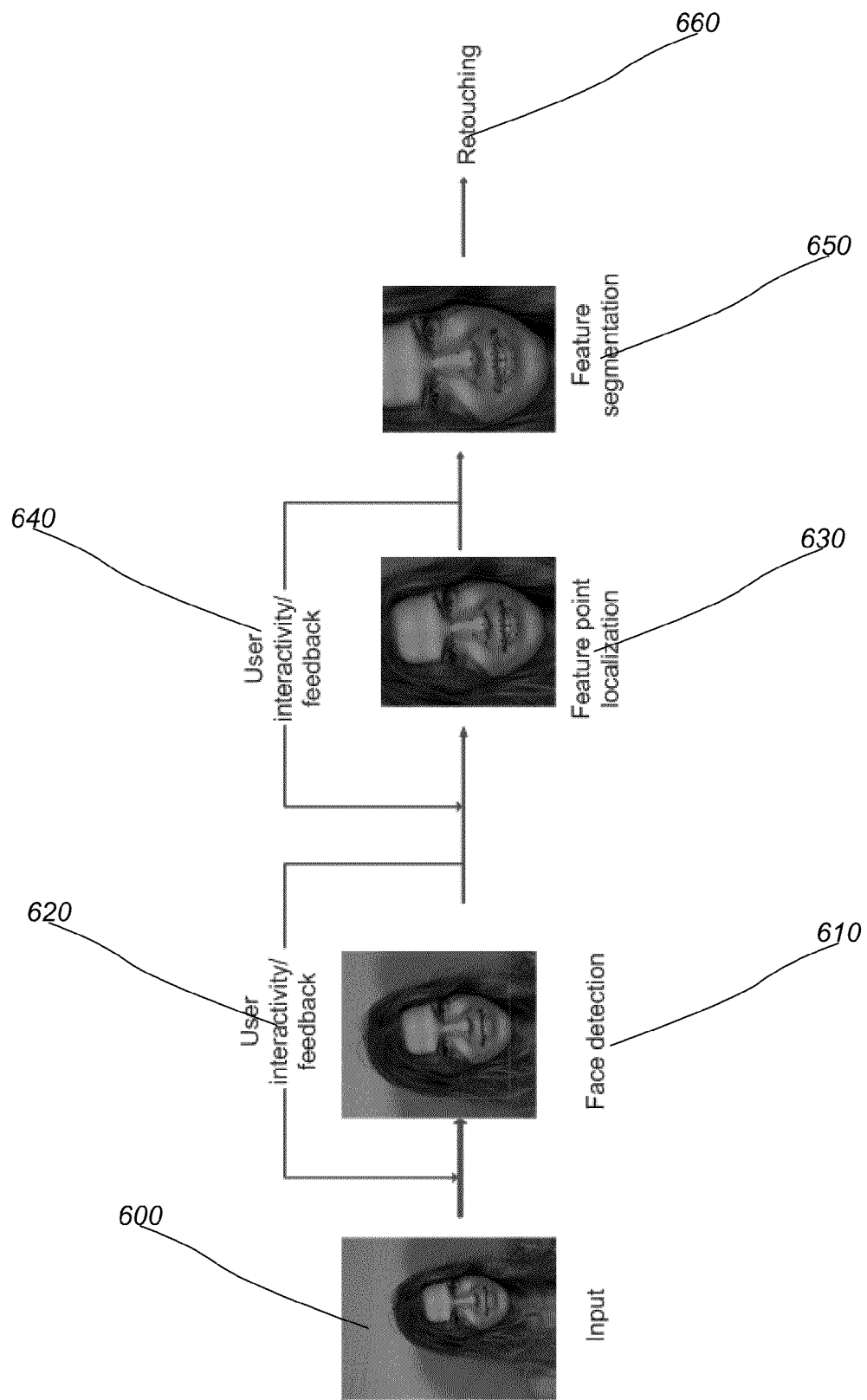
FIG. 6A is a high-level logical flowchart of a method for automated portrait retouching using facial feature localization, according to some embodiments.

FIG. 6A is a high-level logical flowchart of a method for automated portrait retouching using facial feature localization, according to some embodiments. An input image 600 is received. Face detection 610 is performed with interactive user feedback 620. Feature point localization 630 is performed with interactive user feedback 640. Feature segmentation 650 is performed. Retouching 660 is performed.

Figure 6B:
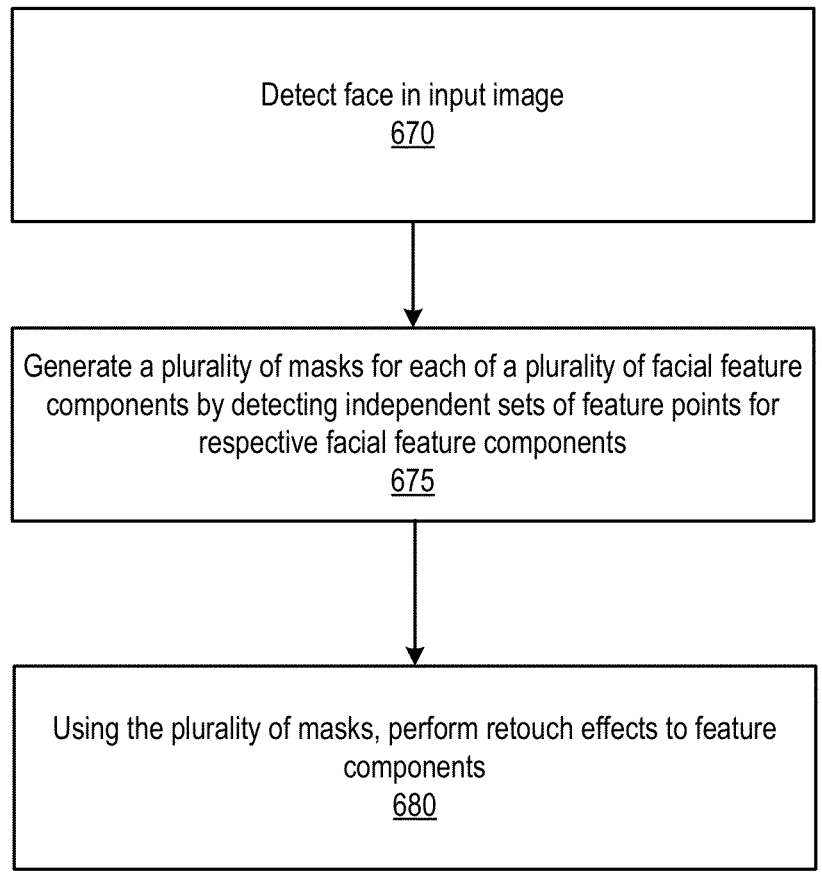
FIG. 6B is a high-level logical flowchart of a method for automated portrait retouching using facial feature localization, according to some embodiments.

FIG. 6B is a high-level logical flowchart of a method for automated portrait retouching using facial feature localization, according to some embodiments. A face is detected in an input image (block 670). A plurality of masks for facial feature components are generated by detecting feature points for facial feature components (block 675). Using the plurality of masks, retouch effects are performed on the feature components (block 680).

Figure 7:
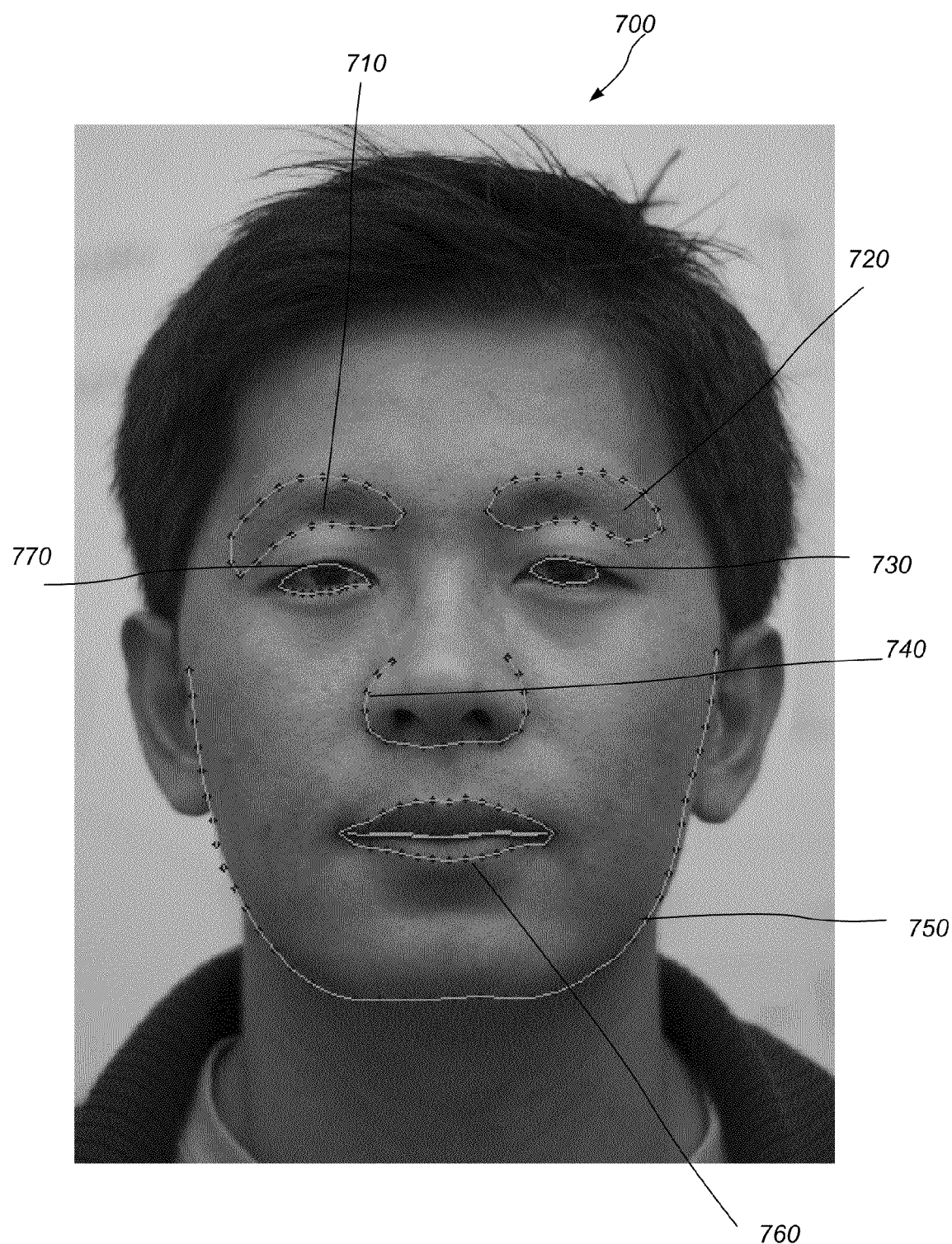
FIG. 7 depicts a set of facial feature outlines resulting from automated facial feature localization, according to some embodiments.

FIG. 7 depicts a set of facial feature outlines resulting from automated facial feature localization, according to some embodiments. Outlines for a left brow 710, right brow 720, right eye 730, nose 740, jawline 750, mouth 760, and left eye 770 are presented.

FIG. 8 illustrates a global shape space for a face shape database, according to some embodiments. A shape distribution 800 presents a series of shape points, as discussed above.

Figure 9:
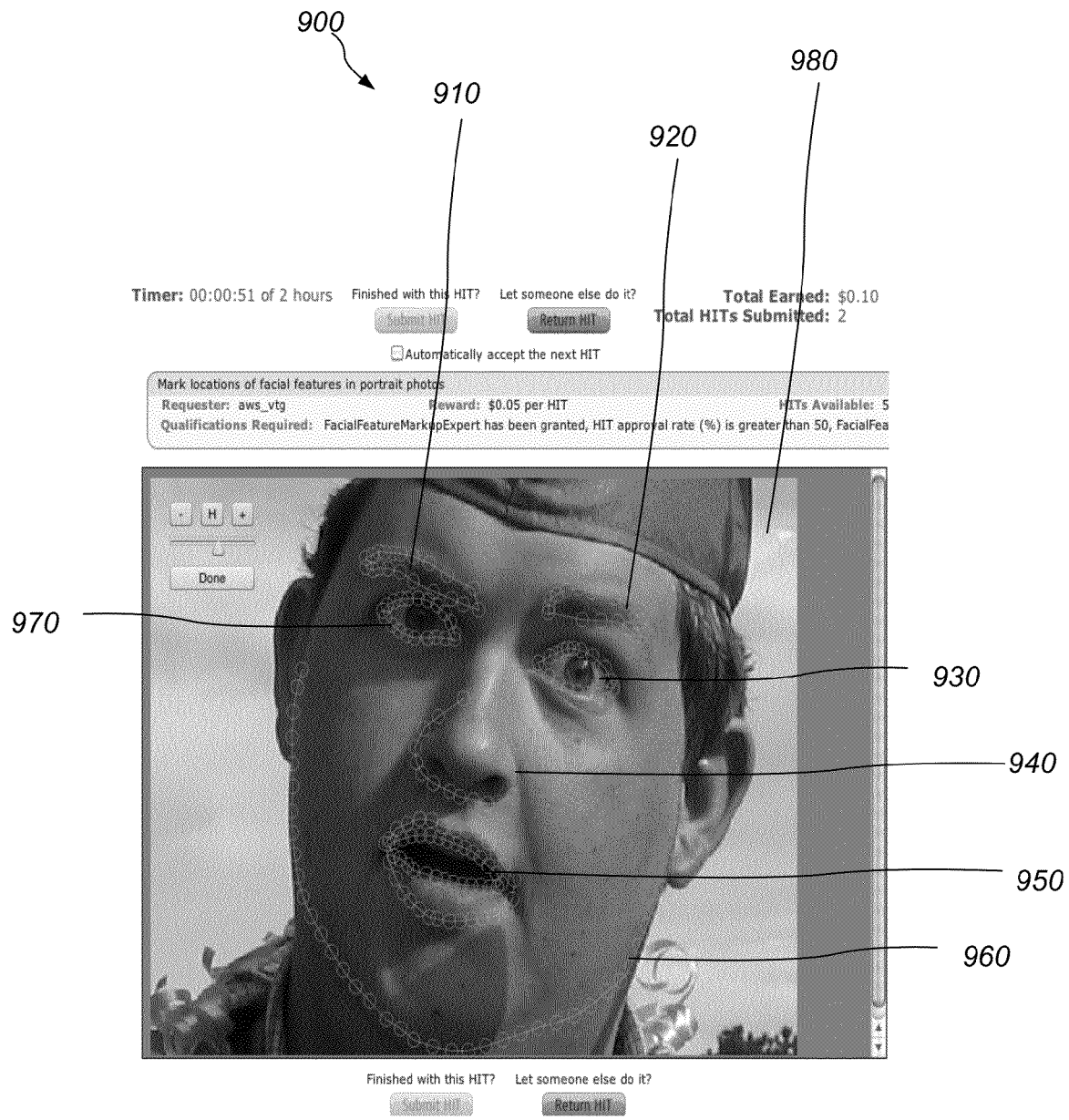
FIG. 9 depicts a set of feature points input to a database for automated facial feature localization, according to some embodiments.
Figure 10:
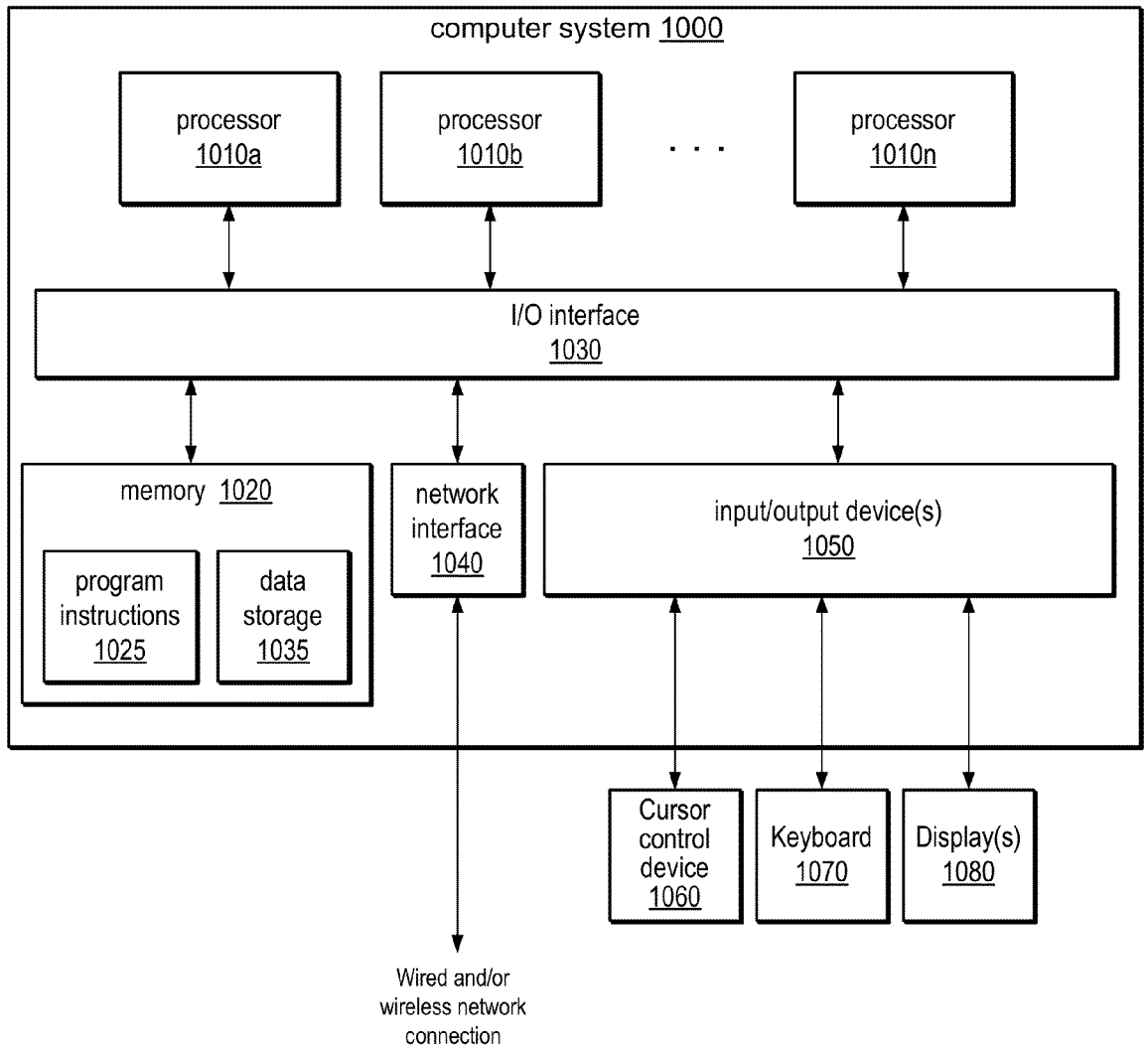
FIG. 10 illustrates an example computer system that may be used in embodiments.

FIG. 9 depicts a set of feature points input to a database for automated facial feature localization, according to some embodiments. In user interface 900, a database input image 980 is displayed to a user, who provides input for locations of feature points (circles) for left brow 910, right brow 920, right eye 930, nose 940, lips 950, jawline 960, and right eye 970.

FIG. 10 illustrates an example computer system that may be used in embodiments. Embodiments of an automated portrait retouching module using facial feature localization and/or automated portrait retouching using facial feature localization image editing techniques as described herein may be executed on one or more computer systems, which may interact with various other devices. One such computer system is illustrated by FIG. 10. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of an automated portrait retouching module using facial feature localization are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 10, memory 1020 may include program instructions 1025, configured to implement embodiments of a facial retouching module as described herein, and data storage 1035, comprising various data accessible by program instructions 1025. In one embodiment, program instructions 1025 may include software elements of embodiments of a facial retouching module as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a facial retouching module as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
    using one or more processors to perform detecting a face in an input image;
    computing a face coordinate frame from a set of predicted feature point locations;
    applying the profile model to obtain a set of feature points for each facial component of the detected face;
    applying global and component-based shape models to generate feature point locations of the each facial component of the detected face; and
    iterating the applying the profile model and the applying the global and component-based shape models until a change in the feature point locations is less than a threshold.

2. The method of claim 1, further comprising
    presenting the feature point locations.

3. The method of claim 1, wherein the method further comprises generating the profile model from a training image data set.

4. The method of claim 1, further comprising estimating transformation parameters by calculating a translation parameter, a scale parameter and a rotation parameter of the detected face relative to the profile model.

5. The method of claim 1, wherein the method further comprises presenting the feature point locations;
    receiving user input representing corrections to selected ones of the feature point locations; and
    iterating the applying the profile model and the applying the global and component-based shape models until a change in the feature point locations is less than a threshold, wherein the iterating the applying the profile model and the applying the global and component-based shape models further comprises treating the corrections to the selected ones of the feature point locations as fixed locations for the selected ones of the feature point locations.

6. The method of claim 1, wherein the applying the component-based shape model further comprises determining local shape parameters for each of a set of components.

7. The method of claim 1, wherein the applying the global shape model further comprises obtaining a set of global shape parameters.

8. A system, comprising:
    at least one processor; and
    a memory comprising program instructions, wherein the program instructions are executable by the at least one processor to perform:
        detecting a face in an input image;
        computing a face coordinate frame from a set of predicted feature point locations;
        applying the profile model to obtain a set of feature points for each facial component of the detected face;
        applying global and component-based shape models to generate feature point locations of the each facial component of the detected face;
        presenting the feature point locations,
        receiving user input representing corrections to selected ones of the feature point locations; and
        iterating the applying the profile model and the applying the global and component-based shape models until a change in the feature point locations is less than a threshold, wherein the program instructions executable by the at least one processor to iterate the applying the profile model and the applying the global and component-based shape models further comprise program instructions executable by the at least one processor to treat the corrections to the selected ones of the feature point locations as fixed locations for the selected ones of the feature point locations.

9. The system of claim 8, further comprising program instructions executable by the at least one processor to perform:
    iterating the applying the profile model and the applying the global and component-based shape models until a change in the feature point locations is less than a threshold; and
    presenting the feature point locations.

10. The system of claim 8, further comprising program instructions executable by the at least one processor to perform:
    generating the profile model from a training image data set.

11. The system of claim 8, wherein the program instructions executable by the at least one processor to perform computing a face coordinate frame from a set of predicted feature point locations further comprise program instructions executable by the at least one processor to perform:
    calculating a translation parameter, a scale parameter and a rotation parameter of the detected face relative to the profile model.

12. The system of claim 8, wherein the program instructions executable by the at least one processor to perform applying the component-based shape model further comprise program instructions executable by the at least one processor to determine local shape parameters for each of a set of components.

13. The system of claim 8, wherein the program instructions executable by the at least one processor to perform applying the global shape model further comprise program instructions executable by the at least one processor to obtaining a set of global shape parameters.

14. A method comprising:
    detecting a face in an input image;
    computing a face coordinate frame from a set of predicted feature point locations;
    applying the profile model to obtain a set of feature points for each facial component of the detected face;
    applying global and component-based shape models to generate feature point locations of the each facial component of the detected face;
    presenting the feature point locations;
    receiving user input representing corrections to selected ones of the feature point locations; and
    iterating the applying the profile model and the applying the global and component-based shape models until a change in the feature point locations is less than a threshold, in which the iterating of the applying the profile model and the applying the global and component-based shape models includes treating the corrections to the selected ones of the feature point locations as fixed locations for the selected ones of the feature point locations.

15. The method of claim 14, further comprising program instructions computer-executable to implement:
   iterating the applying the profile model and the applying the global and component-based shape models until a change in the feature point locations is less than a threshold; and
   presenting the feature point locations.

16. The method of claim 14, further comprising program instructions computer-executable to implement:
   generating the profile model from a training image data set.

17. The method of claim 14, wherein the program instructions computer-executable to implement computing a face coordinate frame from a set of predicted feature point locations further comprise program instructions computer-executable to implement calculating a translation parameter, a scale parameter and a rotation parameter of the detected face relative to the profile model.

18. The method of claim 14, wherein the program instructions computer-executable to implement applying the component-based shape model further comprise program instructions computer-executable to implement determining local shape parameters for each of a set of components.

* * * * *